United States Patent
Konchan et al.

(10) Patent No.: US 10,501,050 B2
(45) Date of Patent: Dec. 10, 2019

(54) VEHICLE IGNITION SYSTEM

(71) Applicant: GM GLOBAL TECHNOLOGY OPERATIONS LLC, Detroit, MI (US)

(72) Inventors: Jeffrey L. Konchan, Romeo, MI (US); Richard J. Lange, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 211 days.

(21) Appl. No.: 15/638,958

(22) Filed: Jun. 30, 2017

(65) Prior Publication Data

US 2019/0001924 A1    Jan. 3, 2019

(51) Int. Cl.

| | |
|---|---|
| *B60R 25/02* | (2013.01) |
| *B60R 25/021* | (2013.01) |
| *B60R 25/20* | (2013.01) |
| *B60R 25/24* | (2013.01) |
| *B60R 25/06* | (2006.01) |

(52) U.S. Cl.
CPC .... *B60R 25/02123* (2013.01); *B60R 25/2063* (2013.01); *B60R 25/248* (2013.01); *B60R 25/066* (2013.01)

(58) Field of Classification Search
CPC .............. B60R 25/02; B60R 25/02123; B60R 25/2063; B60R 25/248; B60R 25/066
USPC ............................................. 70/182–186, 252
See application file for complete search history.

(56) References Cited

U.S. PATENT DOCUMENTS

| | | | | |
|---|---|---|---|---|
| 3,566,635 | A * | 3/1971 | Wolter | B60R 25/02121 70/252 |
| 3,914,967 | A * | 10/1975 | Arman | B60R 25/02121 200/43.08 |
| 3,919,867 | A * | 11/1975 | Lipschutz | B60R 25/02118 403/328 |
| 4,328,688 | A * | 5/1982 | Maiocco | B60R 25/02121 70/186 |
| 4,332,306 | A * | 6/1982 | Turatti | B60R 25/02142 180/287 |
| 4,397,167 | A * | 8/1983 | Maiocco | B60R 25/021 70/252 |
| 4,414,830 | A * | 11/1983 | Maiocco | B60R 25/02128 70/186 |
| 4,771,619 | A * | 9/1988 | Shiramizu | B60R 25/02128 70/186 |

(Continued)

*Primary Examiner* — Suzanne L Barrett
(74) *Attorney, Agent, or Firm* — Quinn IP Law

(57) ABSTRACT

A vehicle ignition system includes an ignition cylinder housing defining an exterior portion, an interior portion and a channel extending at least partially through the interior portion. An ignition cylinder is at least partially received by and adjustable relative to the ignition cylinder housing. The ignition cylinder includes an elongate body defining an exterior portion and an interior portion. A cam member is at least partially received in the channel of the ignition cylinder housing and includes a clutch disposed adjacent to and engaging a portion of the ignition cylinder. A locking mechanism cooperates with the ignition cylinder housing and ignition cylinder includes a locking member having a projection extending therefrom that releasably engages a portion of the ignition cylinder housing when the locking mechanism is placed in the at least one second position to prevent adjustment of the ignition cylinder relative to the ignition cylinder housing.

14 Claims, 2 Drawing Sheets

(56) References Cited

U.S. PATENT DOCUMENTS

| | | | | |
|---|---|---|---|---|
| 5,289,707 A * | 3/1994 | Suzuki | ............... | B60R 25/02123 70/186 |
| 5,836,187 A * | 11/1998 | Janssen | ................... | B60R 25/04 70/252 |
| 6,327,882 B1 * | 12/2001 | Canard | ............. | B60R 25/02118 70/186 |
| 6,516,640 B2 * | 2/2003 | Jacobs | ............. | B60R 25/02128 70/186 |
| 6,718,805 B2 * | 4/2004 | Okuno | ............. | B60R 25/02126 70/186 |
| 6,796,153 B2 * | 9/2004 | Ochi | ................ | B60R 25/02115 70/186 |
| 6,810,701 B2 * | 11/2004 | Lee | ................... | B60R 25/02126 70/186 |
| 6,931,896 B2 * | 8/2005 | Ochi | ................ | B60R 25/02113 70/182 |
| 7,591,158 B2 * | 9/2009 | Konno | ................... | B60R 25/02 70/184 |
| 7,673,483 B2 * | 3/2010 | Flandrinck | ............ | B60R 25/021 70/252 |
| 8,028,552 B2 * | 10/2011 | Ko | ........................ | B60R 25/04 70/252 |
| 8,857,231 B2 * | 10/2014 | Perrin | ..................... | B60R 25/02 70/183 |
| 2003/0015006 A1 * | 1/2003 | Tamukai | ................ | B60R 25/04 70/186 |
| 2004/0003632 A1 * | 1/2004 | Ohtaki | ................... | B60R 25/04 70/252 |

* cited by examiner

ವEHICLE IGNITION SYSTEM

INTRODUCTION

The present disclosure relates to an ignition lock arrangement for a vehicle ignition system.

Vehicle ignition systems generally include an ignition switch and a lock assembly. Ignition systems may be presented in a variety of configurations. An exemplary system may include a lock cylinder assembly that is mechanically unlocked by a key inserted in a slot in a barrel. The key aligns tumblers in the barrel which, when aligned, permit springs in the barrel to retract the side bar into the barrel. With the side bar retracted, the barrel is rotatable in the sleeve to actuate the ignition switch.

The lock cylinder assembly prevents unauthorized operation of the vehicle by preventing rotation of the core to close the ignition switch until a properly bitted key is inserted into a key slot of the core to retract the lock bar from engagement with the housing and permit rotation of the core to close the switch. Most ignition locking arrangements are designed for use to activate the ignition system but do not address deactivation of the ignition system.

SUMMARY

A vehicle ignition system includes an ignition cylinder housing defining an exterior portion, an interior portion and a channel extending at least partially through the interior portion. An ignition cylinder is at least partially received by and adjustable relative to the ignition cylinder housing. The ignition cylinder includes an elongate body defining an exterior portion and an interior portion. A cam member is at least partially received in the channel of the ignition cylinder housing and includes a clutch disposed adjacent to and engaging a portion of the ignition cylinder.

A locking mechanism cooperates with the ignition cylinder housing and ignition cylinder and is adjustable between a first position and at least one second position. The locking mechanism includes a locking member having a projection extending therefrom that releasably engages a portion of the ignition cylinder housing when the locking mechanism is placed in the at least one second position to prevent adjustment of the ignition cylinder relative to the ignition cylinder housing.

The locking mechanism may include a pivot mechanism that adjustably secures the locking member to the exterior portion of the ignition cylinder housing and a biasing member cooperating with the pivot mechanism and locking member that adjusts the locking member between a first position and at least one second position. An aperture extends through the ignition cylinder housing between the exterior portion and the interior portion and is sized to receive the projection of the locking member therethrough.

The clutch includes a slot formed therein that is positioned to at least partially align with the aperture in the ignition cylinder housing. The projection of the locking member releasably engages the slot in the clutch through the aperture in the ignition cylinder housing when the locking mechanism is in the at least one second position to prevent adjustment of the ignition cylinder relative to the ignition cylinder housing.

In another embodiment, the locking mechanism includes a pivot mechanism adjustably securing the locking member to the interior portion of the ignition cylinder and a biasing member cooperating with the pivot mechanism and locking member to adjust the locking member between a first position and at least one second position. An aperture extends through the ignition cylinder between the exterior portion and the interior portion and is sized to receive the projection of the locking member therethrough. The projection of the locking member releasably engages a slot in the ignition cylinder housing through the aperture in the ignition cylinder when the locking mechanism is in the at least one second position to prevent adjustment of the ignition cylinder relative to the ignition cylinder housing.

In yet another embodiment, the locking member of the locking mechanism extends between the clutch and cam member body to restrict movement of the ignition cylinder and ignition cylinder housing when the locking mechanism is adjustably positioned from the first position to the at least one second position. The ignition cylinder may include a receiver disposed in the interior portion of the ignition cylinder. A slot is formed in the first end of the ignition cylinder and is in communication with the receiver to receive a key configured for insertion through the slot to engage the receiver. The interaction of the key and receiver allows adjustment of the ignition cylinder relative to the ignition cylinder housing.

In another embodiment, a vehicle ignition system includes an ignition cylinder housing defining an exterior portion, an interior portion and a channel extending at least partially through the interior portion. An ignition cylinder is at least partially received by and adjustable relative to the ignition cylinder housing. The ignition cylinder includes an elongate body defining an exterior portion and an interior portion. A cam member is at least partially received in the channel of the ignition cylinder housing and includes a clutch disposed adjacent to and engaging a portion of the ignition cylinder.

A locking mechanism cooperates with the ignition cylinder housing and ignition cylinder and is adjustable between a first position and at least one second position. The locking mechanism includes a locking member having a projection extending therefrom that releasably engages the clutch when the locking mechanism is in the at least one second position to prevent adjustment of the ignition cylinder relative to the ignition cylinder housing.

The locking mechanism may include a pivot mechanism that adjustably secures the locking member to the exterior portion of the ignition cylinder housing and a biasing member cooperating with the pivot mechanism and locking member that adjusts the locking member between a first position and at least one second position. A weight may be secured to a portion of the locking member, wherein the weight is positioned on an opposing portion of the locking member from the projection.

An aperture extends through the ignition cylinder housing between the exterior portion and the interior portion and is sized to receive the projection of the locking member therethrough. The clutch includes a slot formed therein that is positioned to at least partially align with the aperture in the ignition cylinder housing. The projection of the locking member releasably engages the slot in the clutch through the aperture in the ignition cylinder housing when the locking mechanism is in the at least one second position to prevent adjustment of the ignition cylinder relative to the ignition cylinder housing.

In yet another embodiment, a vehicle ignition system includes an ignition cylinder housing defining an exterior portion, an interior portion and a channel extending at least partially through the interior portion. An ignition cylinder is at least partially received by and adjustable relative to the ignition cylinder housing. The ignition cylinder includes an elongate body defining an exterior portion and an interior portion. A cam member is at least partially received in the channel of the ignition cylinder housing and includes a clutch disposed adjacent to and engaging a portion of the ignition cylinder.

A locking mechanism cooperates with the ignition cylinder housing and ignition cylinder and is adjustable between a first position and at least one second position. The locking mechanism includes a locking member adjustably secured to the interior portion of the ignition cylinder and having a projection extending therefrom releasably engaging a portion of the ignition cylinder housing when the locking mechanism is in the at least one second position to prevent adjustment of the ignition cylinder relative to the ignition cylinder housing.

The locking mechanism may include a pivot mechanism that adjustably secures the locking member to the interior portion of the ignition cylinder and a biasing member cooperating with the pivot mechanism and locking member that adjusts the locking member between a first position and at least one second position. A weight may be secured to a portion of the locking member, wherein the weight is positioned on an opposing portion of the locking member from the projection.

An aperture extends through the ignition cylinder between the exterior portion and the interior portion and is sized to receive the projection of the locking member therethrough. The projection of the locking member releasably engages a slot in the ignition cylinder housing through the aperture in the ignition cylinder when the locking mechanism is in the at least one second position to prevent adjustment of the ignition cylinder relative to the ignition cylinder housing.

The ignition cylinder may include a receiver disposed in the interior portion of the ignition cylinder. A slot is formed in the first end of the ignition cylinder and is in communication with the receiver to receive a key configured for insertion through the slot to engage the receiver. The interaction of the key and receiver allows adjustment of the ignition cylinder relative to the ignition cylinder housing.

The above features and advantages and other features and advantages of the present disclosure are readily apparent from the following detailed description of the best modes for carrying out the disclosure when taken in connection with the accompanying drawings.

DETAILED DESCRIPTION

Figure 1:
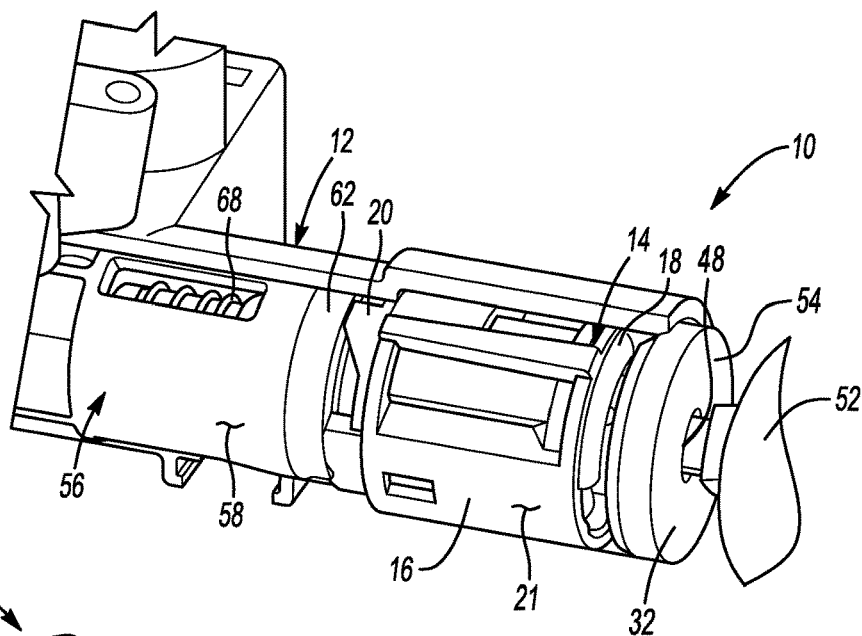
FIG. 1 is a perspective view of a vehicle ignition system incorporating an ignition locking arrangement in accordance with the present disclosure.

Reference will now be made in detail to several embodiments of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity, directional terms such as top, bottom, left, right, up, over, above, below, beneath, rear, and front, may be used with respect to the drawings. These and similar directional terms are not to be construed to limit the scope of the disclosure.

Figure 2:
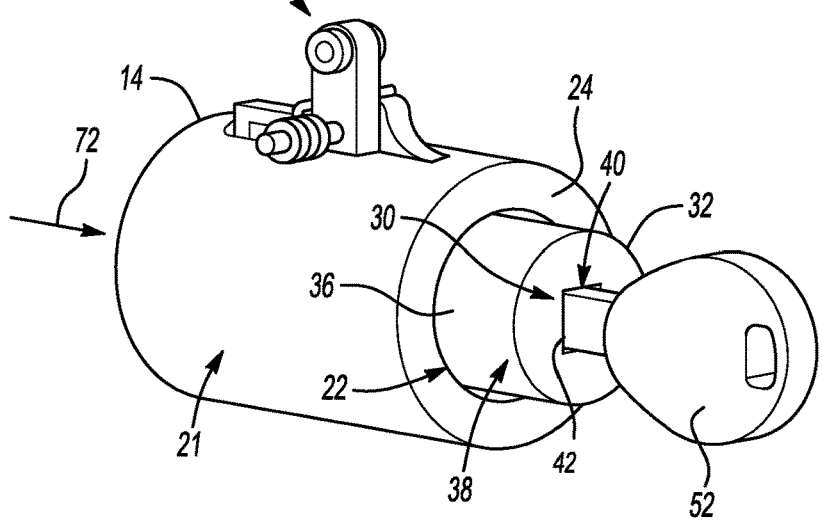
FIG. 2 is a perspective view of the vehicle ignition system incorporating a first embodiment of an ignition locking arrangement.

Referring to the drawings, wherein like reference numbers correspond to like or similar components throughout the several Figures, a vehicle is generally shown at 10. Referring to FIGS. 1 and 2, the vehicle 10 includes an ignition system 12. The ignition system 12 may be operatively connected to a vehicle engine or the like may include any combination of ignition components including an ignition switch, an electronic ignition module, an ignition coil and/or other suitable ignition components.

The ignition system 12 includes an ignition cylinder housing 14 cooperating with a portion of the vehicle 10. The ignition cylinder housing 14 may be integrally formed into a portion of the vehicle 10 or may be formed then securable to a portion of the vehicle 10. For example, the ignition cylinder housing 14 may be integrally formed into or may be secured to a variety of areas in the vehicle, including, but not limited to, a steering column, instrument panel, center console or the like.

Figure 3:
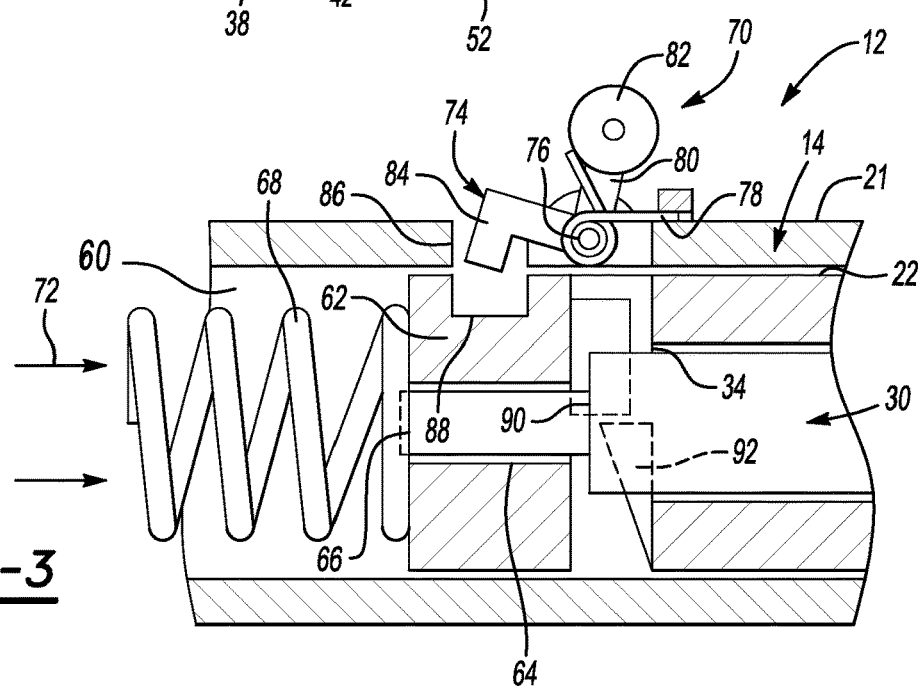
FIG. 3 is a cross-sectional view of the first embodiment of the ignition locking arrangement.

The ignition cylinder housing 14 may be formed in a variety of configurations and/or geometries. As shown in the Figures, the ignition cylinder housing 14 may include a body 16 extending between a first end 18 and an opposing second end 20 of the housing 14. It is contemplated that the body 16 of the housing 14 may form an exterior portion 21 and an interior portion 22 as best shown in FIG. 3 sized to receive an ignition cylinder 30 as will be described in greater detail below. The interior portion 22 may be configured as a cylindrical cavity or channel 24 extending at least partially through the body 16 from the first end 18 toward the second end 20 and cooperating with the first end 18 of the housing 14.

The cavity or channel 24 of the ignition cylinder housing 14 may be sized to receive an ignition cylinder 30. The cylinder 30 may be generally cylindrical in shape to correspond with and be at least partially received in the channel 24. However, it is understood that the ignition cylinder 30 may be formed of a variety of geometries and cooperate with a variety of geometrically shaped channels 24 in the housing 14. The ignition cylinder 30 may be axially movable in the channel 24 of the housing 14 and rotatable relative to the housing 14 to actuate the vehicle ignition system 12 as will be described in greater detail.

Referring additionally to FIGS. 2 and 3, the ignition cylinder 30 includes a first end 32, an opposing second end 34 and an elongate body 36 extending between the first and second ends 32, 34. The elongate body 36 defines an exterior portion 38 and an interior portion 40 including a cavity or channel 42 formed at least partially through the interior portion 40. The channel 42 may cooperate with an opening in the first end 32 of the cylinder 30 at least partially through the body 36 toward the second end 34 of the ignition cylinder 30 and may be configured to receive and cooperate with the ignition cylinder 30. The ignition cylinder 30 is at least partially received within the cavity or channel 24 and may be configured to rotate about an axis relative to the ignition cylinder housing 14.

Referring back to FIG. 1, ignition lock cylinder 30 may also include a slot 48 provided in a bezel 54 on the first end 32 sized to receive and releasably engage a portion of a key 52 that engages a set of tumblers (not shown) housed in the ignition lock cylinder 30. The ignition lock cylinder 30 may include a mechanical or receiver arrangement that may be activated by a user. In one non-limiting example, the ignition lock cylinder 30 may be a mechanical system using tumblers which are movable into an engaged position upon the insertion and rotation of the key 52. When the tumblers or discs align correctly with the key 52, the ignition lock cylinder may be axially and rotatably moved to activate the ignition system 12.

In one non-limiting example, key 52 may be a mechanical key that is inserted into the slot 48. Actuation of the key 52 causes the ignition system 12 to activate a starter (not shown) of the vehicle 10 through a starter switch (not shown). The ignition system 12 may include one or more operating positions. For example, the operating positions may include an inactive or "OFF" position, a multipurpose accessory or "ACC" position, a driving or "ON" position and an ignition or "START" position. It is understood that these positions may vary and need not have the same combination or be in any particular order. For example, it may be possible for the "OFF" position to be positioned between the "ACC" position and the "ON" position, the ignition system may not include an "ACC" position, or there may be additional items, such as a locking position or the like.

The ignition condition relates generally to the position or status of the ignition system. With respect to a vehicle with a standard internal combustion engine, an ignition key in the ignition positions OFF and ACC are considered "inactive" and the ignition positions ON and START are "active." For ease of description, the term "inactive" broadly relates to an ignition position to which the main drive system of the vehicle is not activated. Conversely, the term "active" broadly relates to an ignition position for which the main drive system of the vehicle is activated.

In the case of vehicles having a conventional internal combustion engine as the main drive source, an inactive position is one in which a starter has not yet started the engine and typically involves the training and the ACC position. The "active" position is one in which a starter has already started the engine, or is in the starting process of the engine. The ignition cylinder 30 may be translatable relative to the ignition system housing 14.

As seen best in FIGS. 1 and 2, the first end 32 of the ignition cylinder 30 may include a conventional key slot 48 disposed proximate the first end 18 of the ignition cylinder housing 14. The ignition cylinder 30 may be adjusted radially relative to the ignition cylinder housing 14 and/or axially through the elongate portion 16 of the housing between a retracted position, wherein the ignition cylinder 30 may be substantially completely withdrawn into the cavity in the ignition cylinder housing 14 and an extended position, wherein an outboard or first end 32 of the ignition cylinder 30 projects beyond the first end 18 of the housing 14.

Referring to FIGS. 1 and 2, a bezel 54 may be disposed proximate the first end 32 of the ignition lock cylinder 30 and may cooperate with the first end 18 of the ignition cylinder housing 14. The bezel 54 may cooperate with the ignition cylinder housing 14 such that the bezel 54 is spaced apart from the ignition cylinder housing 14 when the ignition cylinder 30 is in a first or inactive position. The ignition cylinder 30 may be adjusted axially within the cavity or channel 24 such that the ignition cylinder 30 is substantially completely withdrawn into the cavity or channel 24 and the bezel 54 is positioned proximate the first end 18 of the ignition cylinder housing.

Referring now to FIGS. 1 and 3, a cam member 56 may be received in the cavity of the ignition system 12. The cam member 56 may be disposed adjacent to and operatively connected to the second end 34 of the ignition cylinder 30. Cam member 56 includes a body 58 defining a cavity 60. The cavity 60 of the cam member 56 is sized to receive a clutch 62 that may be axially adjustable within the cavity 60 between a first position disposed proximate the second end 34 of the ignition cylinder 30 and at least one second position. The clutch may include an opening 64 sized to receive and removably engage an arm 66 extending from the second end 34 of the ignition cylinder 30. A spring 68 inside the cavity 60 engages the clutch 62 and biases the clutch between the first and at least one second position.

Referring now to FIGS. 2 and 3, a first embodiment of an ignition locking arrangement or locking mechanism 70 for use with the ignition system 12 is disclosed. The ignition locking arrangement or locking mechanism 70 may be disposed adjacent to a portion of the ignition cylinder housing 14 and configured to releasably engage the ignition cylinder 30 within the housing 14. The locking mechanism 70 may prevent the axial movement of the ignition cylinder 30 within the housing 14 in response to an inertial force represented by arrow 72. As a result, the locking mechanism 70 may prevent rotation of the ignition cylinder 30 from a run position to an off position thereby disengaging the ignition system.

The locking mechanism 70 in accordance with a first non-limiting embodiment may include a locking member 74 that is adjustably positioned relative to the ignition cylinder housing 14. As shown in FIG. 2, the locking member 74 is rotatably mounted to the ignition cylinder housing 14 about a pin or pivot mechanism 76. The pivot mechanism 76 may cooperate with a spring or biasing member 78 to position the locking member 74 adjacent the ignition cylinder housing 14 between a first or unlocked position and at least one second or locking position. The locking member 74 may include a lever portion 80 including a weight or ballast 82 that cooperates with the biasing member 78 to adjustably position a projection 84 extending from a portion of the locking member 74. The aperture 86 extends through the ignition cylinder housing 14 between the exterior portion 21 and interior portion 22 and sized to receive the projection 84 therethrough to selectively engage at least one component of the ignition system 12.

Figure 4:
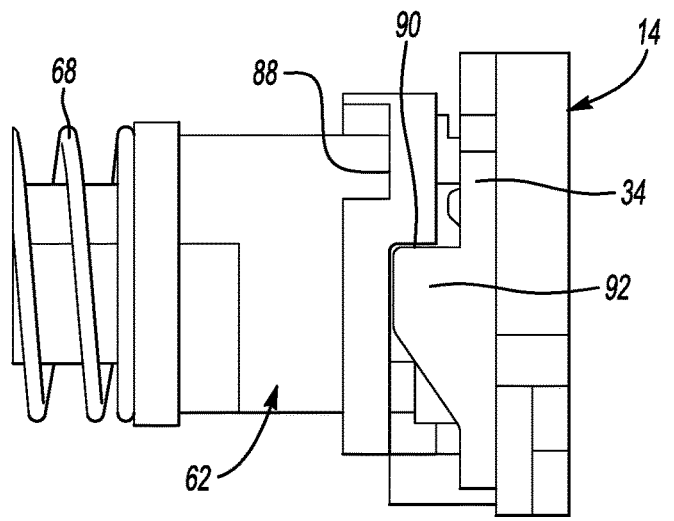
FIG. 4 is a side elevational view of components of the ignition locking arrangement.

Referring now to FIGS. 3 and 4, another non-limiting embodiment of the disclosure is illustrated and described in greater detail. The locking mechanism 70 of the vehicle ignition system 12 is shown in an unlocked position or condition. In the unlocked position, the projection 84 may extend at least partially into the aperture 86 in the ignition cylinder housing 14. Clutch 62 includes a slot 88 that at least partially aligns with the aperture 86 in the ignition cylinder housing 14 when the clutch 62 is biased by spring 68 into position within the cylindrical cavity or channel 24.

Clutch 62 further includes a member 90 extending from the body of the clutch 62. The member 90 is sized to cooperate with and releasably engage a mating portion 92 disposed adjacent the second end 34 of the ignition cylinder housing 14. As is shown in FIG. 3, the mating portion 92 of the ignition cylinder housing 14 receives and cooperates with the member 90 of clutch 62 such that the clutch 62 and ignition cylinder 30 rotate in unison when the ignition cylinder is actuated between the OFF position and the one or more operating positions, such as the ACC position, the ON position and the like.

In response to an inertial force as illustrated by arrow 72, the locking member 74 is translated from a disengaged position to an engaged position. In the engaged position, the projection 84 of the locking member 74 extends through the aperture 86 in the ignition cylinder housing 14 to engage a portion of the slot 88 in the clutch 62. Once inserted in the slot 88 of clutch 62, the projection 84 of the locking member 74 restricts movement or rotation of the clutch 62 in the cavity or channel 24 of the ignition cylinder housing, and thereby, the clutch member 90 cooperating with the mating portion 92 of the ignition cylinder housing 14 restricts movement of the ignition cylinder 30 and ignition cylinder housing 14 from one or more operating positions to the OFF position.

In one non-limiting embodiment of the disclosure, an aperture may be provided in the ignition cylinder housing 14 that is positioned relative to the locking member 74 of the locking mechanism 70. A tool (not shown) may be inserted through the aperture or other portion of the ignition cylinder housing 14 to engage the locking mechanism 70 to manually release the locking member 74 from the at least one second position or an engaged position to the first position or a disengaged position. The tool may be any device or aid that is sized to extend through the aperture or other portion of the ignition cylinder housing 14. For example, a tool may include, but not be limited to, a common household item such as a toothpick or paper clip, or a specialized tool configured to cooperate with the locking mechanism 70 to enable release of the locking member 74 from the clutch 62 or other portion of the ignition cylinder 30 or ignition cylinder housing 14.

Figure 5:
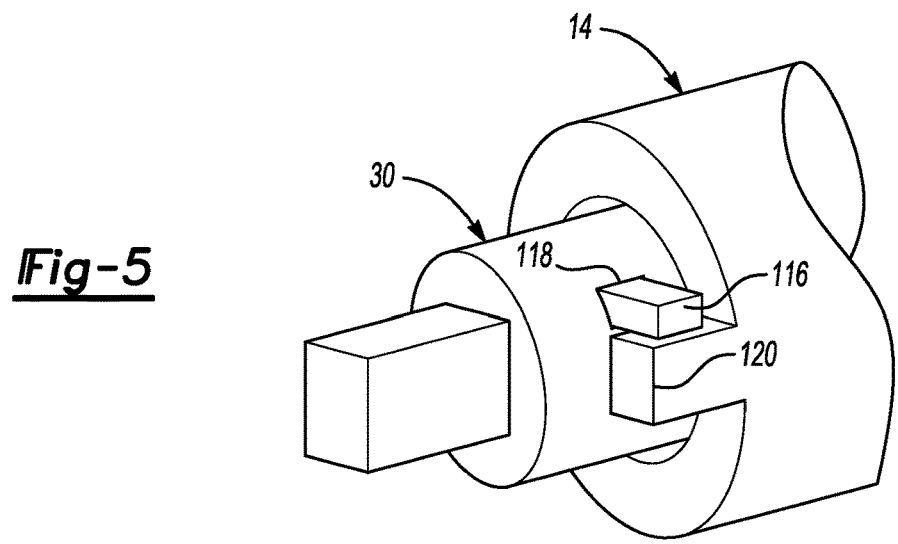
FIG. 5 is a perspective view of another embodiment of the ignition locking arrangement.
Figure 6:
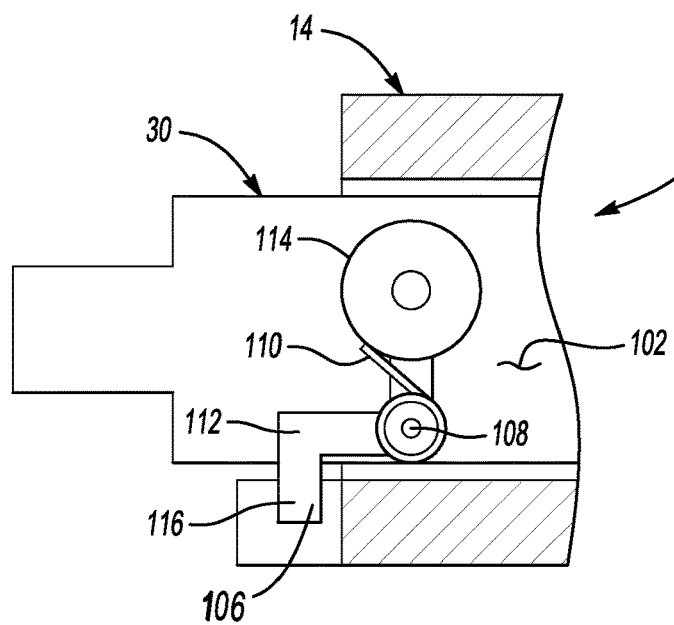
FIG. 6 is a sectional view of the ignition locking arrangement in accordance with the present disclosure.

Referring now to FIGS. 5 and 6, another embodiment of the ignition locking arrangement for use in a vehicle ignition system is illustrated and described in greater detail. In this non-limiting example, the ignition locking arrangement or locking mechanism 100 may be disposed in a cavity 102 of the ignition cylinder 30 to prevent the axial movement of the ignition cylinder 30 within the ignition cylinder housing 14 in response to an inertial force. Locking mechanism 100 may include a locking member 106 that is adjustably positioned relative to the ignition cylinder 30.

As shown in FIG. 6, the locking member 106 is rotatably mounted to the ignition cylinder 30 about a pin or pivot mechanism 108. The pivot mechanism 108 may cooperate with a spring or biasing member 110 to position the locking member 106 adjacent the ignition cylinder. The locking member 106 may include a lever portion 112 including a weight or ballast 114 that cooperates with the biasing member 110 to adjustably position a projection 116 extending from a portion of the locking member 106. The projection 116 is sized to extend through an aperture 118 in the ignition cylinder 30 to selective engage an abutment 120 in the ignition cylinder housing 14.

Referring now to FIGS. 5 and 6, the locking mechanism 100 of the vehicle ignition system 12 is shown in a locked position or condition. In the locked position, the projection 116 extends through the aperture 118 in the ignition cylinder 30 to engage the abutment 120 in the ignition cylinder housing 14 in response to an inertial force. Once inserted in the abutment 120 of the ignition cylinder housing 30, the projection 116 of the locking member 106 restricts movement or rotation of the ignition cylinder 30 from one or more operating positions to the OFF position. In yet another embodiment, a locking member may be adjustably positioned between the clutch 62 and cam member body 56 between the first or unlocked position and at least one second or locked position to restrict movement of the ignition cylinder and ignition cylinder housing.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A vehicle ignition system comprising:
an ignition cylinder housing defining an exterior portion, an interior portion and a channel extending at least partially through the interior portion;
an ignition cylinder at least partially received by and adjustable relative to the ignition cylinder housing, the ignition cylinder including an elongate body defining an exterior portion and an interior portion;
a cam member at least partially received in the channel of the ignition cylinder housing, the cam member including a clutch disposed adjacent to and engaging a portion of the ignition cylinder; and
a locking mechanism cooperating with at least one of the ignition cylinder housing and ignition cylinder, wherein the locking mechanism is adjustable between a first position and at least one second position,
wherein the locking mechanism includes a locking member having a projection extending therefrom releasably engaging a portion of the ignition cylinder housing when the locking mechanism is placed in the at least one second position to prevent adjustment of the ignition cylinder relative to the ignition cylinder housing,
wherein the locking member extends between the clutch and cam member body to restrict movement of the ignition cylinder and ignition cylinder housing when the locking mechanism is adjustably positioned from the first position to the at least one second position.

2. The vehicle ignition system of claim 1 wherein the locking mechanism further comprises:
a pivot mechanism adjustably securing the locking member to the exterior portion of the ignition cylinder housing; and
a biasing member cooperating with the pivot mechanism and locking member to adjust the locking member between a first position and at least one second position.

3. The vehicle ignition system of claim 2 further comprising an aperture extending through the ignition cylinder housing between the exterior portion and the interior portion and sized to receive the projection of the locking member therethrough.

4. The vehicle ignition system of claim 3 wherein the clutch includes a slot formed therein that is positioned to at least partially align with the aperture in the ignition cylinder housing.

5. The vehicle ignition system of claim 4 wherein the projection of the locking member releasably engages the slot in the clutch through the aperture in the ignition cylinder housing when the locking mechanism is in the at least one second position to prevent adjustment of the ignition cylinder relative to the ignition cylinder housing.

6. The vehicle ignition system of claim 1 wherein the locking mechanism further comprises:
- a pivot mechanism adjustably securing the locking member to the interior portion of the ignition cylinder; and
- a biasing member cooperating with the pivot mechanism and locking member to adjust the locking member between a first position and at least one second position.

7. The vehicle ignition system of claim 6 further comprising an aperture extending through the ignition cylinder between the exterior portion and the interior portion and sized to receive the projection of the locking member therethrough.

8. The vehicle ignition system of claim 7 wherein the projection of the locking member releasably engages a slot in the ignition cylinder housing through the aperture in the ignition cylinder housing when the locking mechanism is in the at least one second position to prevent adjustment of the ignition cylinder relative to the ignition cylinder housing.

9. The vehicle ignition system of claim 1 wherein the ignition cylinder further comprises:
- a receiver disposed in the interior portion of the ignition cylinder;
- a slot formed in the first end of the ignition cylinder in communication with the receiver; and
- a key configured for insertion through the slot to engage the receiver,
- wherein the interaction of the key and receiver allows adjustment of the ignition cylinder relative to the ignition cylinder housing.

10. A vehicle ignition system comprising:
- an ignition cylinder housing defining an exterior portion, an interior portion and a channel extending at least partially through the interior portion;
- an ignition cylinder at least partially received by and adjustable relative to the ignition cylinder housing, the ignition cylinder including an elongate body defining an exterior portion and an interior portion;
- a cam member at least partially received in the channel of the ignition cylinder housing, the cam member including a clutch disposed adjacent to and engaging a portion of the ignition cylinder; and
- a locking mechanism cooperating with the ignition cylinder housing and ignition cylinder adjustable between a first position and at least one second position,
- wherein the locking mechanism includes a locking member adjustably secured to the interior portion of the ignition cylinder housing, the locking member including a projection extending therefrom releasably engaging a portion of the ignition cylinder housing when the locking mechanism is placed in the at least one second position to prevent adjustment of the ignition cylinder relative to the ignition cylinder housing,
- wherein the locking member extends between the clutch and cam member body to restrict movement of the ignition cylinder and ignition cylinder housing when the locking mechanism is adjustably positioned from the first position to the at least one second position.

11. The vehicle ignition system of claim 10 wherein the locking mechanism further comprises:
- a pivot mechanism adjustably securing the locking member to the interior portion of the ignition cylinder;
- a biasing member cooperating with the pivot mechanism and locking member to adjust the locking member between a first position and at least one second position; and
- a weight secured to a portion of the locking member, wherein the weight is positioned on an opposing portion of the locking member from the projection.

12. The vehicle ignition system of claim 11 further comprising an aperture extending through the ignition cylinder between the exterior portion and the interior portion and sized to receive the projection of the locking member therethrough, wherein the projection of the locking member releasably engages a slot in the ignition cylinder housing through the aperture in the ignition cylinder when the locking mechanism is in the at least one second position to prevent adjustment of the ignition cylinder relative to the ignition cylinder housing.

13. The vehicle ignition system of claim 10 wherein the ignition cylinder further comprises:
- a receiver disposed in the interior portion of the ignition cylinder;
- a slot formed in the first end of the ignition cylinder in communication with the receiver; and
- a key configured for insertion through the slot to engage the receiver,
- wherein the interaction of the key and receiver allows adjustment of the ignition cylinder relative to the ignition cylinder housing.

14. The vehicle ignition system of claim 1 wherein the ignition cylinder further comprises:
- a receiver disposed in the interior portion of the ignition cylinder;
- a slot formed in the first end of the ignition cylinder in communication with the receiver; and
- a key configured for insertion through the slot to engage the receiver,
- wherein the interaction of the key and receiver allows adjustment of the ignition cylinder relative to the ignition cylinder housing.

* * * * *